United States Patent Office 3,144,450
Patented Aug. 11, 1964

3,144,450
INTERMEDIATE PRODUCTS IN THE SYNTHESIS OF 21-ACYLOXY-11β-HYDROXY-3,20 - DIOXO - 4-PREGNEN-18-OIC ACID (11-18)-LACTONE
Wataru Nagata, Nishinomiya-shi, Hyogo Prefecture, Japan, assignor to Shionogi & Co., Ltd., Osaka, Japan
No Drawing. Filed June 29, 1962, Ser. No. 206,181
Claims priority, application Japan Mar. 12, 1960
25 Claims. (Cl. 260—239.57)

This invention relates to a synthetic method of producing 21-acyloxy-11β-hydroxy-3,20-dioxo-4-pregnen-18-oic acid (11-18)-lactone represented by the following formula:

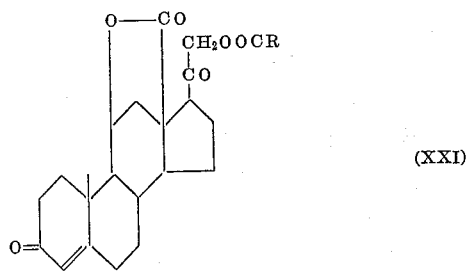

(XXI)

wherein R is a lower alkyl radical such as methyl, ethyl and propyl.

The lactone of Formula XXI is useful as an intermediate in the synthesis of aldosterone and can be produced from 17-hydroxyimino-4-androstene-3,11-dione (adrenosterone 17-oxime), which can be prepared from naturally existing cortisone according to the method of this invention.

Accordingly, a primary object of this invention is to provide a utilization method for the said natural steroid. Another object of this invention is to provide a synthetic method for the preparation of aldosterone. A further object of the invention is to provide intermediates in the synthesis of aldosterone. Other objects will be apparent to those skilled in the art to which this invention pertains.

The method of this invention can be illustrated by the following scheme:

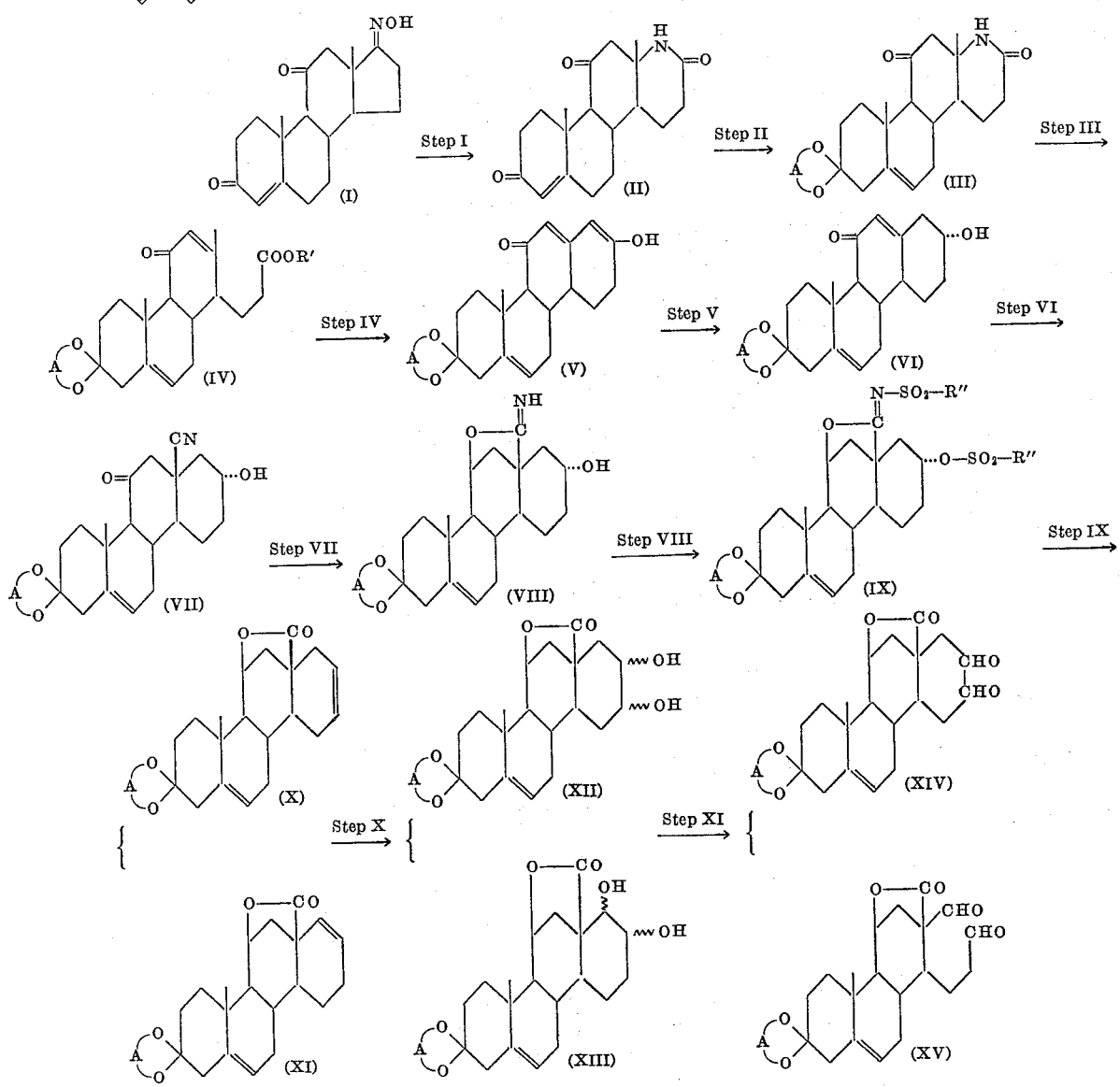

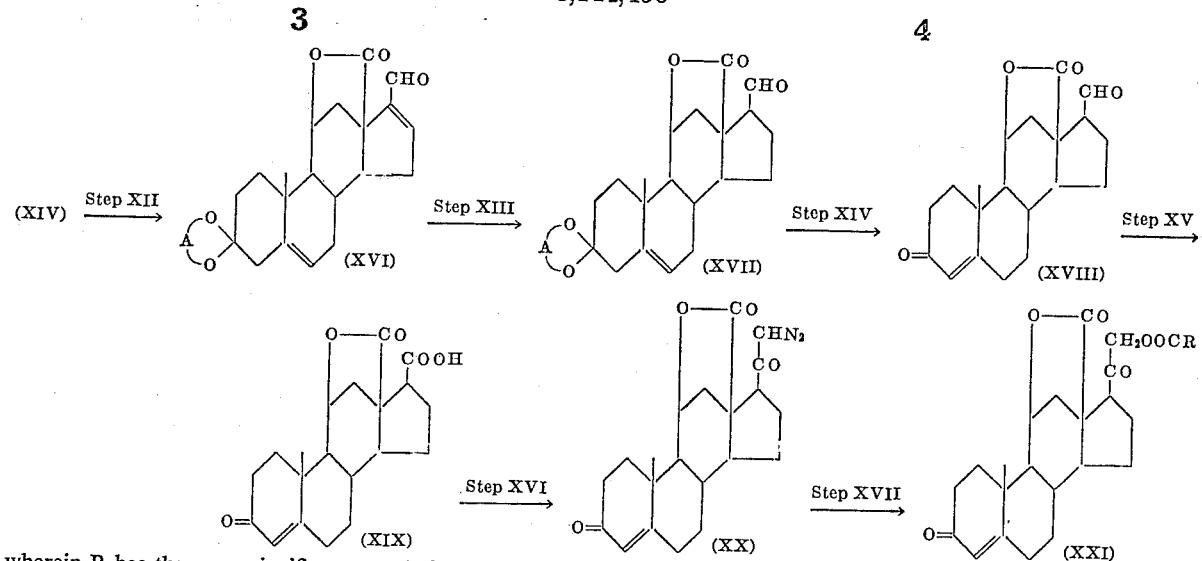

(XIV) →Step XII→ (XVI) →Step XIII→ (XVII) →Step XIV→ (XVIII) →Step XV→

(XIX) →Step XVI→ (XX) →Step XVII→ (XXI)

wherein R has the same significance as designated above, R' is a hydrogen atom or a lower alkyl radical such as methyl, ethyl and propyl, R" is a lower alkyl radical such as methyl, ethyl and propyl, a phenyl radical or a lower alkylphenyl radical such as tolyl and xylyl, A is a lower alkylene radical such as ethylene and trimethylene and the ripple mark (∫) represents an undetermined configuration. The scheme should be understood as showing the substantial order of the steps in the synthesis, modifications and equivalents—including possible detours—being omitted. For instance, the ketalized oxo radical at 3-position in some compounds shown therein may be changed to the free oxo radical, depending on the reagent used, in the course of reaction in some steps. However, prior to the performance of the subsequent step, the resulting free oxo compound can be easily changed into the corresponding protected oxo compound by a conventional ketalation procedure.

The starting material of this invention is 17-hydroxy-imino-4-androstene-3,11-dione (adrenosterone 17-oxime) of Formula I which is described and claimed in the copending application of W. Nagata, M. Marisada and T. Sugasawa, Serial No. 191,303, filed April 30, 1962, now Patent No. 3,055,917. The oxime I can be prepared by oxidizing cortisone with chromic acid (M. Steiger et al.: Helv. Chim. Acta, 20, 817 (1937)) and subjecting the produced 4-androstene-3,11,17-trione (adrenosterone) to oximation with the protection of the 3-oxo radical as an enol-ether group before the oximation and the elimination of the protecting enol-ether group after the oximation. These steps are representable by the following scheme:

Firstly, the starting oxime I is subjected to Beckmann rearrangement to give 17a-aza-D-homo-4-androstene-3,11,17-trione of Formula II (Step I). In this step, the reaction may be carried out by treating the oxime I with an acidic substance such as phosphorus pentachloride, acetyl chloride, benzenesulfonyl chloride and p-acetamido-benzenesulfonyl chloride in a basic solvent such as pyridine and picoline at room temperature.

Secondly, the resulting 3-oxo lactam II is ketalized to 3,3 - (lower)alkylenedioxy - 17a - aza - D - homo - 5-androstene-11,17-dione of Formula III (Step II). The reaction may be performed according to a per se conventional manner. Thus, the 3-oxo lactam III is heated with a lower alkylene glycol such as ethylene glycol and propylene glycol in the presence of an acidic substance such as methanesulfonic acid, benzenesulfonic acid and p-toluenesulfonic acid in an inert organic solvent such as benzene and toluene while distilling to produce the lactam III.

Thirdly, the lactam III is hydrolyzed, followed by esterification to give 3,3-(lower)alkylenedioxy-11-oxo-13,17-seco-5,12-androstadien-17-oic acid lower alkyl ester of Formula IV (Step III). The hydrolysis reaction may be carried out by heating the lactam III with an alkaline substance such as sodium hydroxide and potassium hydroxide in a suitable medium having a high boiling point such as butanol and pentanol. For the following esterification, there may be adopted a variety of conventional operations. For instance, the resulting free acid may be refluxed with a lower alkanol such as methanol, ethanol and propanol in the presence of an acid such as hydrochloric acid and sulfuric acid. In this case, however, the deketalation at 3-position proceeds simultaneously and,

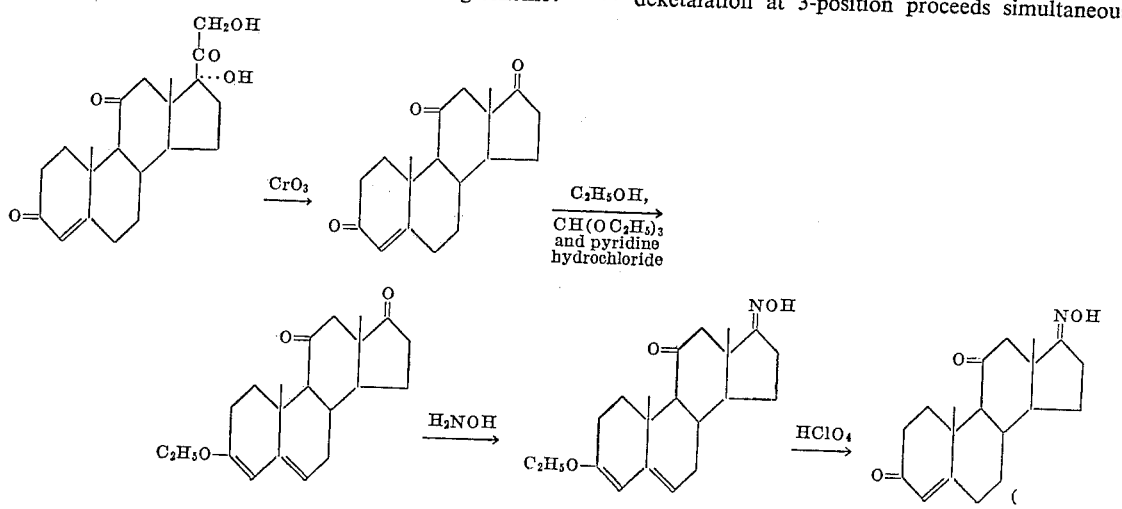

therefore, the ketalation of the free oxo radical in the resulting compound should be carried out prior to the execution of the subsequent step. The esterification is also attained by treating the said free acid with diazoalkane such as diazomethane and diazoethane in an inert organic solvent such as ether, dioxane and tetrahydrofuran while ice-cooling. This esterification procedure may be preferably adopted, because any undesirable side-reaction does not take place.

Fourthly, the ester IV is subjected to cyclization to afford 3,3 - (lower)alkylenedioxy - 17 - hydroxy - 18 - nor-D-homo-5,12,17-androstatriene-11-one of Formula V (Step IV). The reaction may be carried out by heating the ester IV in the presence of an alkali metal alkoxide such as sodium tert-pentoxide and potassium tert-butoxide in an inert organic solvent such as ether, benzene, toluene and xylene while refluxing.

Fifthly, the enol V is reduced to 3,3-(lower)alkylenedioxy - 17α - hydroxy - 18 - nor - D - homo - 5,12 - androstadiene-11-one of Formula VI (Step V). The reaction can be executed by treating the enol V with a metallic hydride such as lithium borohydride, sodium borohydride and tri-tert-butoxyaluminum hydride in a suitable solvent such as ether, methanol, ethanol, dioxane, tetrahydrofuran and water, if necessary, while ice-cooling.

Sixthly, the 17α-ol VI is subjected to cyanation at the 13-position to give 3,3-(lower)alkylenedioxy-17α-hydroxy-11-oxo-D-homo-5-androstene-18-nitrile of Formula VII (Step VI). The reaction in this step may be carried out according to a novel angular cyanation procedure which is described and claimed in my copending application, Serial No. 127,097, filed July 27, 1961. Thus, the reaction can be performed by treating the 17α-ol VI with a cyanating agent such as alkali metal cyanide, alkaline earth metal cyanide, lithium aluminum cyanide, cyanomagnesium halide, alkylaluminum cyanide and cyanoalkylaluminum halide, preferably in the presence of a catalyst such as ammonium halide, acetic acid, ammonium acetate and alkali bisulfite, in an inert organic solvent such as alkanol, ether, hydrocarbon, dialkylformamide, dioxane and tetrahydrofuran at about 20 to 100° C. Preferably, Lewis acids or suitable bases such as trialkylamine, aluminum trialkoxide, alkylaluminum alkoxide, trialkylaluminum and alkylaluminum halide may be used in combination with hydrocyanic acid in an inert organic solvent as described above except alkanol.

Seventhly, the resulting nitrile VII is reduced to give 3,3 - (lower)alkylenedioxy - 11β,17α - dihydroxy - D - homo-5-androsten-18-imidic acid (11-18)-lactone of Formula VIII (Step VII). The reaction may be carried out by treating the nitrile VII with a metallic hydride such as lithium aluminum hydride, lithium borohydride, sodium borohydride and tri-tert-butoxyaluminum hydride in a solvent such as water, ether, methanol, ethanol, dioxane and tetrahydrofuran, if necessary, while refluxing.

Eighthly, the imidic acid lactone VIII is subjected to sulfonylation at the O,N-positions to give 3,3-(lower)-alkylenedioxy - 17α - (substituted)sulfonyloxy - 11β - hydroxy - N - (substituted)sulfonyl-D-homo-5-androsten-18-imidic acid (11-18)-lactone of Formula IX (Step VIII). The reaction may be executed by treating the imidic acid lactone VIII with a (lower)alkane-, benzene- or (lower)alkylbenzenesulfonyl halide such as methanesulfonyl chloride, ethanesulfonyl chloride, benzenesulfonyl chloride and p-toluenesulfonyl chloride in a basic medium at a room temperature. As the basic medium, there may be exampled pyridine, picoline and triethylamine. These basic solvents may be employed as a mixture with another inert organic solvent such as benzene, toluene and xylene.

Ninthly, the disulfonate IX is hydrolyzed with the simultaneous deacidation whereby a mixture of 3,3-(lower)- alkylenedioxy-11β-hydroxy-D-homo-5,16-androstadien-18-oic acid (11-18)-lactone of Formula XI and 3,3 - (lower) - alkylenedioxy-11β-hydroxy-D-homo-5,17-androstadien-18-oic acid (11-18)-lactone of Formula XI is prepared (Step IX). The reaction may be performed by treating the disulfonate IX with a basic substance such as sodium hydroxide, potassium hydroxide, sodium carbonate and potassium carbonate in an aqueous medium while refluxing. The reaction in this step proceeeds according to the following scheme:

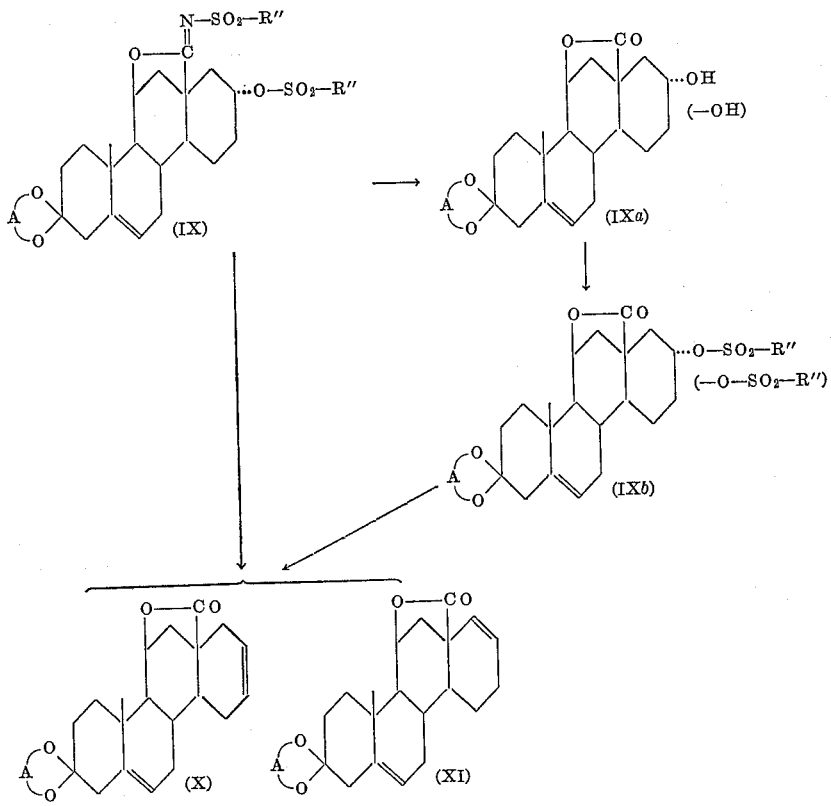

wherein R″ and A each have the same significances as designated above. The reaction from the disulfonate IX to the Δ¹⁶-D-homo lactone X and the Δ¹⁷-D-homo lactone XI can proceed by one step. However, there is inevitably by-produced the 17α-ol lactone IXa. Therefore, the reaction mixture may be again substituted to sulfonylation as in Step VIII and then deacidation as in Step IX with or without the previous separation of the mixture of the Δ¹⁶-D-homo lactone X and the Δ¹⁷-D-homo lactone XI according to a conventional procedure, i.e., chromatographic procedure. In this case, the deacidation may be performed in the presence of an organic basic substance such as pyridine, picoline and collidine. From the commercial viewpoint, the sulfonylation and the deacidation may be repeated without the separation to obtain a mixture of the Δ¹⁶-D-homo lactone X and the Δ¹⁷-D-homo lactone XI. This mixture is usually subjected to the reaction in the following step without the removal of the Δ¹⁷-D-homo lactone XI, because the removal of the by-product can be readily accomplished after the execution of the reaction in the following step.

Tenthly, the above-prepared mixture of the Δ¹⁶-D-homo lactone X and the Δ¹⁷-D-homo lactone XI is oxidized, followed by decomposition to afford a mixture of 3,3-(lower)alkylenedioxy-11β,16ξ,17ξ-trihydroxy-D-homo-5-androsten-18-oic acid (11–18)-lactone of Formula XII and 3,3-(lower)alkylenedioxy-11β,17ξ,17aξ-trihydroxy - D - homo - 5 - androsten-18-oic acid (11–18)-lactone of Formula XIII (Step X). The oxidation may be carried out by treating the mixture of the Δ¹⁶-D-homo lactone X and the Δ¹⁷-D-homo lactone XI with osmium tetroxide in an inert organic solvent such as ether, tetrahydrofuran and dioxane. The subsequent decomposition can be accomplished by treating the intermediarily produced substance with hydrogen sulfide or sodium bisulfite in the presence of a basic substance such as pyridine, picoline and collidine in an inert organic solvent such as ether, tetrahydrofuran and dioxane. The separation of the 16,17-diol XII from the produced mixture is readily attained in a conventional manner, i.e., chromatographic procedure.

Nextly, the thus-obtained 16,17-diol XII is further oxidized to 3,3-(lower)alkylenedioxy-11β-hydroxy-16,17-dioxo-16,17-seco-D-homo-5-androsten-18-oic acid (11–18)-lactone of Formula XIV (Step XI). As the oxidizing agent, there may be exampled lead tetraacetate and periodic acid. The reaction proceeds readily in a suitable solvent such as water, dioxane, pyridine and benzene at room temperature. By the application of the same oxidation procedure to the 17,17a-diol XIII, there is obtained 3,3 - (lower) - alkylenedioxy-11β-hydroxy-17,17a-dioxo-17,17a - seco-D-homo-5-androsten-18-oic acid (11–18)-lactone of Formula XV.

Nextly, the above-prepared dialdehyde XIV is subjected to condensation to give 3,3-(lower)alkylenedioxy-11β-hydroxy - 17-formyl-5,16-androstadien-18-oic acid (11-18)-lactone of Formula XVI (Step XII). The reaction may be carried out by heating the dialdehyde XIV with a salt such as trimethylamine acetate and triethylamine acetate in an inert solvent such as benzene, toluene and xylene.

Nextly, the Δ¹⁶-aldehyde XVI is reduced to 3,3-(lower)-alkylenedioxy - 11β-hydroxy-17β-formyl-5-androsten-18-oic acid (11-18)-lactone of Formula XVII (Step XIII). The reaction can be accomplished by reducing the Δ¹⁶-aldehyde XVI catalytically using palladium-carbon in an organic solvent such as dioxane, tetrahydrofuran, methanol and ethanol.

Nextly, the 17-aldehyde XVII is subjected to deketalation whereby 3-oxo-17-formyl-11β-hydroxy-4-androsten-18-oic acid (11-18)-lactone of Formula XVIII (Step XIV). The reaction may be carried out according to a per se conventional manner. Thus, the 17-aldehyde XVII is heated with an acid in an aqueous medium to afford the 3-oxo-aldehyde XVIII.

Nextly, the 3-oxo-aldehyde XVIII is subjected to oxidation to give 3-oxo-11β-hydroxy-4-androstene-17,18-dioic acid (11-18)-lactone of Formula XIX (Step XV). The reaction may be carried out by treating the 3-oxo aldehyde XVIII with an oxidizing agent such as silver oxide, sodium dichromate, potassium dichromate and chromic acid-sulfuric acid in an aqueous medium.

Nextly, the 17,18-dicarboxylic acid XIX is converted into 3,20-dioxo-11β-hydroxy-21-diazo-4-pregnen-18-oic acid (11-18)-lactone of Formula XX (Step XVI). The conversion may be carried out by esterifying the 17,18-dicarboxylic acid XIX with an acid halide forming agent such as sulfuryl chloride, thionyl chloride, phosphorus pentachloride and oxalyl chloride and subjecting the resulting acid halide to diazotization using diazomethane. In these reactions, there may be employed an inert organic solvent such as benzene, toluene, xylene and ether. The reaction condition may be suitably selected in accordance with the reagent employed.

Lastly, the diazoketone XX is subjected to esterification to give the lactone XXI. The reaction can proceed readily by treating the diazoketone XX with a carboxylic acid such as acetic acid and propionic acid while refluxing.

Although the method of this invention is hereinbefore illustrated step by step, some of these steps may be executed successively without the isolation of the product in each step.

The finally produced lactone XXI is a known compound and can be converted into a well-known mineralocorticoid, aldosterone, according to a conventional method (Von Euw et al.: Helv. Chim. Acta, 38, 1423 (1955)) represented by the following scheme:

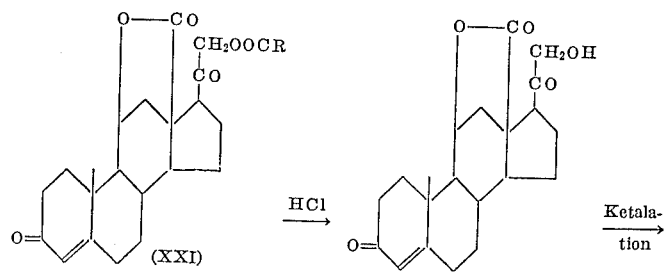

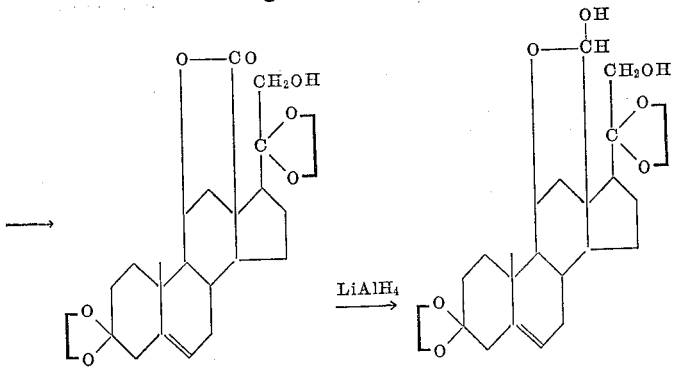

Aldosterone wherein R has the same significance as designated above.

The following examples illustrate presently preferred methods of carrying out the present invention.

*Example 1*

To a solution of 29.50 g. of 17-hydroxyimino-4-androstene-3,11-dione (I) in 295 ml. of anhydrous pyridine is added 29.50 g. of p-acetamidobenzenesulfonyl chloride. The reaction vessel is sealed with a stopper and allowed to stand at room temperature for 2 days in darkness. To the brown reaction mixture is added 855 ml. of water and the mixture allowed to stand overnight. Then, the stirred and ice-cooled reaction mixture is adjusted to pH 1-2 by dropwise addition of a mixture of 120 ml. of sulfuric acid and 300 ml. of water and extracted with chloroform. The extract is washed with water and then with 2 N-sodium carbonate solution and dried over anhydrous sodium sulfate. The chloroform solution is passed through columns of 200 g. of neutral alumina and 10 g. of activated carbon, which are then washed thoroughly with coloroform. All the eluates are combined and evaporated to dryness under reduced pressure. Recrystallization from methanol gives 15.50 g. of crystals (A) melting at 298–301° C. (decomp.) and 6.55 g. of crystals (B) melting at 294–300° C. (decomp.). The mother liquor is chromatographed on 125 g. of alumina. From eluates with benzene-chloroform (19:1–4:1) mixture is obtained 1.80 g. of crystals (C) melting at 143–145° C. and then from eluates with benzene-chloroform (1:1) mixture is obtained 4.75 g. of crystals (D) melting at 295–300° C. (decomp.). The crystals (A), (B) and (D) are combined and recrystallized from methylene dichloride-methanol mixture to give pure 17a-aza-D-homo-4-androstene-3,11,17-trione (II) as plates, M.P. 299–302° C. (decomp.). *Analysis.*—Calcd. for $C_{19}H_{25}O_3N$ (315.40): C, 72.35; H, 7.99; N, 4.44. Found: C, 72.30; H, 8.09; N, 4.50. $[\alpha]_D^{31}$ +172.0±2° (CHCl$_3$).

$\lambda_{max.}^{EtOH}$ 238 m$\mu$ ($\epsilon$ 17,600). $\nu_{max.}^{Nujol}$ 3225, 1694, 1674 cm.$^{-1}$ The crystals (C) are recrystallized from acetone to give pure 3,11-dioxo-13,17-seco-5,12-androstadiene-17-nitrile as long plates, M.P. 145–146° C. *Analysis.*—Calcd. for $C_{19}H_{23}O_2N$ (297.38): C, 76.73; H, 7.80; N, 4.71. Found: C, 76.52; H, 8.02; N, 4.96. $[\alpha]_D^{24}$ +148.1±2° (CHCl$_3$).

$\lambda_{max.}^{EtOH}$ 137.7 m$\mu$ ($\epsilon$ 29,300). $\nu_{max.}^{Nujol}$ 2256, 1663 cm.$^{-1}$

*Example 2*

To a suspension of 30.00 g. of 17a-aza-D-homo-4-androstene-3,11,17-trione (II) in 1,000 ml. of ethylene glycol is added 0.90 g. of p-toluenesulfonic acid monohydrate and the mixture is distilled at 80–90° C. under reduced pressure (3–4 mm. Hg). Removing about 300 ml. of solvent, crystals are precipitated. After cooling, the reaction mixture is made alkaline by addition of ethanolic solution of potassium hydroxide and extracted with chloroform. The extract is washed with water, dried over anhydrous sodium sulfate, and evaporated under reduced pressure until precipitation of crystals is observed. Then, large amounts of ether are added to the concentrate and crystals are collected by filtration, thereafter washed with ether-acetone (3:1) mixture and then with ether to give crystals: 32.23 g. melting at 285–286° C. and 1.56 g. melting at 283–285° C. Recrystallization from methylene dichloride-acetone mixture gives pure 3,3-ethylenedioxy-17a-aza-D-homo-5-androstene-11,17-dione (III), M.P. 293–294° C. *Analysis.*—Calcd. for $C_{21}H_{29}O_4N$ (359.45): C, 70.17; H, 8.13; N, 3.90. Found: C, 70.16; H, 8.20; N, 3.81. $[\alpha]_D^{26}$ −27.8±2° (CHCl$_3$).

$\nu_{max.}^{Nujol}$ 3219, 3096, 1712, 1684, 1602 cm.$^{-1}$

*Example 3*

A mixture of 20.00 g. of 3,3-ethylenedioxy-17a-aza-D-homo-5-androstene-11,17-dione (III), 400 ml. of 1-butanol, 80.00 g. of sodium hydroxide and 40 ml. of water is refluxed for 5 hours and concentrated under reduced pressure. After cooling, the concentrate is treated with ether to remove neutral substances. The aqueous layer is acidified to pH 4–5 with 4 N-phosphoric acid under ice-cooling and extracted with chloroform. The extract is washed with water and dried over anhydrous sodium sulfate. To the chloroform solution is added a solution of diazomethane in ether (generated from 25 g. of nitrosomethylurea) under ice-cooling. After standing at room temperature for 30 minutes, 10 ml. of acetic acid is added under ice-cooling and the mixture is washed with 2 N-sodium carbonate solution and ice-water, dried over anhydrous sodium sulfate, and evaporated under reduced pressure to give 20 g. of pale yellow oily residue which is purified by distillation at 220–225° C. (bath temperature) under reduced pressure (0.01 mm. Hg). Thus purified oily product is confirmed as pure 3,3-ethylenedioxy-11-oxo-13,17-seco-5,12-androstadien-17-oic acid methyl ester (IV) by elemental analysis and infra-red spectrum measurement. *Analysis.*—Calcd. for $C_{22}H_{30}O_5$ (374.46): C, 70.56; H, 8.08. Found: C, 70.71; H, 8.23. $[\alpha]_D^{26}$ −19.6±1° (CHCl$_3$).

$\lambda_{max.}^{EtOH}$ 237.2 m$\mu$ ($\epsilon$ 13,000). $\nu_{max.}^{CHCl_3}$ 1731, 1660 cm.$^{-1}$

*Example 4*

A solution of 2 g. of metallic potassium in 100 ml. of anhydrous tertiary butyl alcohol is evaporated to dryness. The residue is treated twice by the process comprising dissolving in 100 ml. of anhydrous benzene and evaporating to dryness. To the boiling mixture of thus produced residue and 100 ml. of benzene is added dropwise a solution of 548 mg. of 3,3-ethylenedioxy-11-oxo-13,17-seco-5,12-androstadien-17-oic acid methyl ester (IV) in 50 ml. of anhydrous benzene and the mixture is refluxed for 4 hours with stirring under nitrogen current. After cooling the mixture is poured into ice-water and the benzene layer is separated off. The aqueous layer is extracted thoroughly with benzene to remove neutral substances. The aqueous layer is neutralized to pH 6.4 and extracted with chloroform. The extract is washed with water and then with 5%-sodium bicarbonate solution, dried over anhydrous sodium sulfate and evaporated to dryness to give 396 mg. of residue. Recrystallization from methylene dichloride-acetone mixture gives 251 mg. of crystals, M.P. 215–221.5° C. (decomp.). Further recrystallization from methanol gives pure 3,3-ethylenedioxy-17-hydroxy-18-nor-D-homo-5,12,17-androstatrien-11-one (V) as pale yellow fine plates, M.P. 219–221° C. (decomp.). Analysis.—Calcd. for $C_{21}H_{26}O_4$ (342.42): C, 73.66; H, 7.66. Found: C, 73.90; H, 7.94. $[\alpha]_D^{21}$ −67.0±2° ($CHCl_3$), $[\alpha]_D^{20}$ −63.6±2° (dioxane).

$\lambda_{max.}^{EtOH}$ 325 m$\mu$ ($\epsilon$ 26,400), 387 m$\mu$ ($\epsilon$ 8,890)

The absorption maximum of 325 m$\mu$ disappears by enolformation when a drop of N/10-sodium hydroxide solution is added to the tested ethanolic solution.

$\lambda_{max.}^{EtOH}$ 387 m$\mu$ ($\epsilon$ 79,700). $\nu_{max.}^{KBr}$ 1628 (w.), 1584, 1513, 1484 cm.$^{-1}$. $\nu_{max.}^{CHCl_3}$ 1721, 1669 cm.$^{-1}$ Semicarbazone: M.P. >310° C. Analysis.—Calcd. for $C_{22}H_{29}O_4N_3$ (399.48): C, 66.18; H, 7.32; N, 10.52. Found: C, 65.21; H, 7.68; N, 10.22.

$\lambda_{max.}^{EtOH}$ 353 m$\mu$ ($\epsilon$ 30,300)

Example 5

A solution of 6.164 g. of 3,3-ethylenedioxy-17-hydroxy-18-nor-D-homo-5,12,17-androstatrien-11-one (V) in 1,200 ml. of methanol is cooled to −9° C. and 2.72 g. of sodium borohydride is added with stirring. Then the mixture is stirred at the same temperature for 1 hour. After addition of 5.15 ml. of acetic acid the mixture is stirred at −9 to −5° C. for 1 hour. The reaction mixture is poured into ice-water and extracted with chloroform. The extract is washed with 2 N-sodium carbonate solution under ice-cooling and then with water, dried over anhydrous sodium sulfate and evaporated to dryness under reduced pressure. Recrystallization from acetone gives 4.117 g. of crystals melting at 214–223° C. Further recrystallization from methylene dichloride-acetone mixture gives pure 3,3-ethylenedioxy-17$\alpha$-hydroxy-18-nor-D-homo-5,12-androstadien-11-one (VI) as columns, M.P. 219–221° C. Analysis.—Calcd. for $C_{21}H_{28}O_4$ (344.44): C, 73.22; H, 8.19. Found: C, 73.48; H, 8.36. $[\alpha]_D^{23}$ −84.0±2° ($CHCl_3$).

$\lambda_{max.}^{EtOH}$ 240.0 m$\mu$ ($\epsilon$ 14,200). $\nu_{max.}^{CHCl_3}$ 1660, 3635 cm.$^{-1}$ Acetate: M.P. 223–227.5° C. Analysis.—Calcd. for $C_{23}H_{30}O_5$ (386.47): C, 71.48; H, 7.82. Found: C, 71.42; H, 7.89. $[\alpha]_D^{27}$ −2.9±2° ($CHCl_3$).

$\lambda_{max.}^{EtOH}$ 237 m$\mu$ ($\epsilon$ 12,100). $\nu_{max.}^{CHCl_3}$ 1731, 1660 cm.$^{-1}$

Example 6

A mixture of 1.451 g. of 3,3-ethylenedioxy-17$\alpha$-hydroxy-18-nor-D-homo-5,12-androstadien-11-one (VI), 548 mg. of potassium cyanide, 338 mg. of ammonium chloride, 73 ml. of dimethylformamide and 7.3 ml. of water is refluxed for 7 hours. After addition of 113 mg. of ammonium chloride, the solvent is distilled off under reduced pressure. A small amount of water is added to the residue and extracted with chloroform. The extracts are washed with water, dried over anhydrous sodium sulfate and evaporated to dryness under reduced pressure. Recrystallization for methanol or acetone-ether mixture gives 1.437 g. of 3,3-ethylenedioxy-17$\alpha$-hydroxy-11-oxo-D-homo-5-androsten-18-nitrile (VII) as thick plates or columns, M.P. 236.5–238.5° C. or 239–241° C. Analysis.—Calcd. for $C_{22}H_{29}O_4N$: C, 70.75; H, 7.96; N, 3.70. Found: C, 70.85; H, 7.86; N, 3.81. $[\alpha]_D^{21}$ −4.8±2° or −4.0±2° ($CHCl_3$: c. 1.233 or c. 1.081).

$\lambda_{max.}^{EtOH}$ 205.3 m$\mu$ ($\epsilon$ 2,190 or 2,210). $\nu_{max.}^{CHCl_3}$ 2245, 1716, 1109 cm.$^{-1}$

Example 7

A mixture of 7.810 g. of 3,3-ethylenedioxy-17$\alpha$-hydroxy-11-oxo-D-homo-5-androstene-18-nitrile (VII), 390 ml. of tetrahydrofuran and 39 ml. of water is refluxed on a water bath. 3.18 g. of sodium borohydride is divided into 4 portions and added to the refluxing mixture every 30 minutes. Totally, the mixture is refluxed for 2 hours. After concentrating the reaction mixture under reduced pressure to remove most of the tetrahydrofuran, it is diluted with water and extracted with chloroform. The extract is washed with water, dried over anhydrous sodium sulfate and evaporated to dryness under reduced pressure to give 8.09 g. of crystalline residue. Recrystallization from methylene dichloride-methanol mixture gives 6.869 g. of 3,3-ethylenedioxy-11$\beta$,17$\alpha$-dihydroxy-D-homo-5-androsten-18-imidic acid (11-18)-lactone (VIII) as fine plates, M.P. 263–267° C. Two more recrystallizations give pure crystals melting at 263–264.5° C. Analysis.—Calcd. for $C_{22}H_{31}O_4N$ (373.48): C, 70.75; H, 8.37; N, 3.75. Found: C, 70.72; H, 8.47; N, 3.81. $[\alpha]_D^{25}$ +15.1±3° ($CHCL_3$).

$\lambda_{max.}^{EtOH}$ 206 m$\mu$ ($\epsilon$ 3,600). $\nu_{max.}^{CHCl_3}$ 3626, 3400, 3292, 1683 cm.$^{-1}$

Example 8

To a solution of 7.258 g. of 3,3-ethylenedioxy-11$\beta$,17$\alpha$-dihydroxy-D-homo-5-androsten-18-imidic acid (11-18)-lactone (VIII) in 210 ml. of anhydrous pyridine (not fully dissolved) is added portionwise 26.20 g. of p-toluene-sulfonyl chloride under ice-cooling. After 20 minutes partially suspended crystals are dissolved. Then the reaction mixture is allowed to stand at room temperature for 13 hours. After addition of about 10 g. of ice, the mixture is allowed to stand for 1 hour. After addition of 300 ml. of chloroform, the mixture is poured into 1,000 ml. of 8 N-phosphoric acid containing ice, adjusted to pH 3 and the chloroform layer is separated. The aqueous layer is extracted with chloroform. The chloroform layers are combined, washed with 4 N-phosphoric acid at 0° C., with water, with N-sodium bicarbonate solution under ice-cooling and twice with water in turn, dried over anhydrous sodium sulfate and evaporated to dryness under reduced pressure to give 14.32 g. of residue. The residue is dissolved in acetone and crystallized by addition of ether to give 12.305 g. of 3,3-ethylenedioxy - 17$\alpha$ - (p - toluenesulfonyloxy) - 11$\beta$ - hydroxy - N - (p - toluenesulfonyl) - D - homo - 5 - androsten - 18-imidic acid (11-18)-lactone (IX$a$), M.P. 177–178° C. (decomp.). Recrystallization from acetone-ether mixture gives fine plates melting at 179–180° C. decomp.). Analysis.—Calcd. for $C_{36}H_{43}S_2O_8N$ (681.83): C, 63.41; H, 6.36; S, 9.40; N, 2.05. Found: C, 63.43; H, 6.42; S, 9.19; N, 2.03. $[\alpha]_D^{24}$ −35.3±2° ($CHCl_3$).

$\lambda_{max.}^{EtOH}$ 207 m$\mu$ ($\epsilon$ 23,000), 226 m$\mu$ ($\epsilon$ 27,000). $\nu_{max.}^{CHCl_3}$ 1640, 1323, 1179 cm.$^{-1}$

Example 9

To a solution of 2.190 g. of 3,3-ethylenedioxy-11$\beta$,17$\alpha$-dihydroxy-D-homo-5-androsten-18-imidic acid (11-18)-lactone (VIII) in 75 ml. of anhydrous pyridine is added dropwise 4.12 g. of methanesulfonyl chloride and the mixture is allowed to stand at room temperature for 14 hours. After addition of 10 g. of ice the mixture is allowed to stand for further 2 hours and poured into 300 ml. of 4 N-phosphoric acid containing ice. Then, the mixture is adjusted to pH 3.5 and extracted with chloroform. The extract is washed with 4 N-phosphoric acid, water, N-sodium bicarbonate solution and water in turn under ice-cooling, dried over anhydrous sodium sulfate and evaporated under reduced pressure to give 3.40 g. of residue. The residue is crystallized from acetone-ether mixture to give 2.734 g. of 3,3-ethylenedioxy-17$\alpha$-methanesulfonyloxy-11$\beta$ - hydroxy - N - methanesulfonyl - D - homo-5-androsten-18-imidic acid (11-18)-lactone (IX$b$), M.P. 168–172° C. (decomp.). Recrystallization from acetone-ether mixture gives cubic crystals melting at 171.5–172.5° C. (decomp.). *Analysis.*—Calcd. for $C_{24}H_{35}S_2O_8N$ (529.65): C, 54.42; H, 6.66; S, 12.11; N, 2.64. Found: C, 54.25; H, 6.63; S, 11.93; N, 2.79.

$[\alpha]_D^{29}$ −64.5±2° (CHCl₃). $\lambda_{max.}^{EtOH}$ 206 mμ (ε 9,800). $\nu_{max.}^{CHCl_3}$ 1645, 1315, 1128 cm.⁻¹

Example 10

A mixture of 2.619 g. of 3,3-ethylenedioxy-17α-methanesulfonyloxy - 11β - hydroxy - N - methanesulfonyl - D-homo-5-androsten-18-imidic acid (11-18)-lactone (IXb), 520 ml. of dimethylformamide, 9.10 g. of potassium carbonate and 140 ml. of water is refluxed for 10 hours in an air bath and then evaporated to dryness under reduced pressure. To the residue are added 200 ml. of 15%-sodium chloride solution and 200 ml. of chloroform and the chloroform layer is separated. The aqueous layer is extracted with chloroform and all of the chloroform layers are combined, washed with 2 N-sodium hydroxide solution and with water, dried over anhydrous sodium sulfate and evaporated to dryness under reduced pressure to give 1.864 g. of crystalline residue.

To a solution of thus obtained residue in 54 ml. of anhydrous pyridine is added 20.4 g. of methanesulfonyl chloride and the mixture is allowed to stand at room temperature for 18 hours. After addition of about 5 g. of ice, the mixture is allowed to stand for further 1 hour and poured into 500 ml. of 4 N-phosphoric acid with ice. After saturating it with sodium chloride, the mixture is extracted with chloroform. The extract is washed with 4 N-phosphoric acid, sodium chloride solution, N-sodium bicarbonate solution and sodium chloride solution under ice-cooling, dried over anhydrous sodium sulfate and evaporated under reduced pressure to give 2.06 g. of crystalline residue.

A mixture of thus obtained crystalline residue, 390 ml. of dimethylformamide, 7.16 g. of potassium carbonate and 130 ml. of water is refluxed for 5 hours, and evaporated to dryness under reduced pressure. To the residue are added 100 ml. of sodium chloride solution and 100 ml. of chloroform and the chloroform layer is separated. The aqueous layer is extracted with two portions of 80 ml. of chloroform and the chloroform layer is separated. combined, washed twice with sodium chloride solution, dried over anhydrous sodium sulfate and evaporated to dryness under reduced pressure to give 1.828 g. of crystalline residue. The residue is chromatographed on 60 g. of neutral alumina. From eluates with benzene is obtained 896 mg. of crystals (A), M.P. 216–219° C. From following eluates with benzene are obtained thick plates (B) melting at 190–206° C.

($\nu_{max.}^{CHCl_3}$ 3456, 1732 cm.⁻¹: presumed to be 17β-hydroxy-(11-18)-lactone)

and from further eluates with chloroform are obtained thin plates (C) melting at 253–257° C. (identical with an authentic sample of 17α-hydroxy-(11-18)-lactone obtained through another route). The crystals (B) and (C) are combined and dissolved in 20 ml. of pyridine. After addition of 1.53 g. of methanesulfonyl chloride under ice-cooling, the mixture is allowed to stand for 18 hours at room temperature and further for 1.5 hours with ice. Then the mixture is treated in the same manner as described above to give 744 mg. of crystalline residue. A solution of thus obtained residue in 30 ml. of 2,4,6-collidine is refluxed for 5 hours and concentrated under reduced pressure (12 mm. Hg). To the concentrate is added 4 N-phosphoric acid under ice-cooling, adjusted to pH 3, and extracted with chloroform. The extract is washed with N-sodium bicarbonate solution and sodium chloride solution, dried over anhydrous sodium sulfate and evaporated to dryness under reduced pressure to give 616 mg. of crystalline residue. The residue is chromatographed on 15 g. of neutral alumina. From eluates with benzene is obtained 173 mg. of crystals melting at 215–218° C. which is identical with the former crystals (A). Totally 1.067 g. is yielded. It is confirmed by mixed melting point determination, elemental analysis and infra-red spectrum measurement that thus obtained product is a mixture of 3,3-ethylenedioxy-11β - hydroxy - D - homo - 5,16 - androstadien - 18 - oic acid (11-18)-lactone (X) and 3,3-ethylenedioxy-11β-hydroxy-D-homo-5,17-androstadien-18-oic acid (11-18)-lactone (XI).

Another fraction eluated with benzene-chloroform (4:1–1:1) mixture is recrystallized from methylene dichloride-acetone mixture to give 114 mg. of fine needles melting at 278–280° C. Further recrystallizations give pure 3,3 - ethylenedioxy - 17β - methanesulfonamido-11β-hydroxy-D-homo-5-androsten-18-oic acid (11-18)-lactone, M.P. 288–290° C. *Analysis.*—Calcd. for $C_{23}H_{33}O_6SN$ (451.56): C, 61.17; H, 7.37; S, 7.10; N, 3.10. Found: C, 60.68; H, 7.56; S, 7.30; N, 3.03. $[\alpha]_D^{25}$ +17.6±2° (CHCl₃).

$\lambda_{max.}^{EtOH}$ 206 mμ (ε 3,000). $\nu_{max.}^{CHCl_3}$ 3271, 1750, 1323, 1140 cm.⁻¹

Example 11

A mixture of 12.00 g. of 3,3-ethylenedioxy-17α-(p-toluenesulfonyloxy) - 11β - hydroxy - N - (p - toluenesulfonyl)-D-homo-5-androsten-18-imidic acid (11-18)-lactone (IXa), 1,200 ml. of dimethylformamide, 20.73 g. of potassium carbonate and 300 ml. of water is refluxed for 11 hours and evaporated to dryness under reduced pressure. The resultant residue is dissolved in a mixture of sodium chloride solution and chloroform and the chloroform layer is separated. The remaining aqueous layer is extracted with chloroform. The extracts are combined and washed successively with sodium chloride solution, 2 N-sodium hydroxide solution and with sodium chloride solution. After drying over anhydrous sodium sulfate, the extract is evaporated to dryness under reduced pressure.

The evaporation residue (6.99 g.) is reacted with 6.05 g. of methanesulfonyl chloride in 70 ml. of anhydrous pyridine as in Example 10, whereby 7.31 g. of crystalline substance is obtained. This is refluxed for 5 hours with 100 ml. of 2,4,6-collidine and the mixture is concentrated under reduced pressure. The concentrate is poured into 80 ml. of 4 N-phosphoric acid containing ice and extracted with chloroform. After washing successively with 4 N-phosphoric acid, water, 1 N-sodium bicarbonate solution and water under ice-cooling, the extract is dried over anhydrous sodium sulfate and then evaporated to dryness under reduced pressure. The residue (7.32 g.) thereby obtained is chromatographed on 125 g. of neutral alumina. The eluate with petroleum ether-benzene (2:1) mixture gives 2.667 g. of a mixture of 3,3-ethylenedioxy-11β-hydroxy-D-homo-5,16- and -5,17-androstadien-18-oic acid (11-18)-lactone (X and XI) which has been obtained already in Example 10 as crystals melting at 212–223° C. after recrystallization from methylene dichloride-acetone-ether mixture. Further eluates with benzene and benzene-chloroform (2:1) mixture give 648 mg. of 3,3-ethylenedioxy - 17β - (p - toluenesulfonamido) - 11β - hydroxy-D-homo-5-androsten-18-oic acid (11-18)-lactone as crystals melting at 274–275° C. after recrystallization with a mixture of methylene dichloride-methanol. Further recrystallization gives pure crystals, M.P. 282–284.5° C. *Analysis.*—Calcd. for $C_{29}H_{37}O_6SN$ (527.65): C, 66.01; H, 7.07; S, 6.08; N, 2.65. Found: C, 66.18; H, 7.06, S, 6.07; N, 2.56. $[\alpha]_D^{24}$ +19.3±2° (CHCl₃).

$\lambda_{max.}^{EtOH}$ 205 mμ (ε 12,000), 229 mμ (ε 11,000). $\nu_{max.}^{CHCl_3}$ 3260, 1749, 1324, 1158, 1141 cm.⁻¹

Example 12

A mixture of 3,3-ethylenedioxy-11β-hydroxy-D-homo-5,16- and -5,17-androstadien-18-oic acid (11-18)-lactone (X and XI) (896 mg.) obtained in the above Example 10 or 11 is dissolved in 20 ml. of tetrahydrofuran and thereto is added a mixture of 648 mg. of osmium tetroxide and 4 ml. of anhydrous ether under ice-cooling. The reaction mixture is shaken for 10 minutes under ice-cooling and kept for 17 hours at room temperature, whereby black precipitations are obtained. To the reaction mixture are added 600 ml. of anhydrous dioxane and 1 ml. of pyridine and well stirred to effect dissolving. After stirring for 15 minutes under ice-cooling and continuous blowing of hydrogen sulfide thereinto, the mixture is stirred further for 45 minutes at room temperature and filtered through a layer of infusorial earth (Celite). The filtrate is concentrated under reduced pressure and the residue is dissolved in chloroform. After washing with 4 N-phosphoric acid, water, sodium bicarbonate solution and again with water under ice-cooling, the solution is dried over anhydrous sodium sulfate and evaporated to dryness under reduced pressure. The residue (781 mg.) is chromatographed on 8 g. of neutral alumina. From eluate with benzene-chloroform (4:1–1:1) mixture is recovered unchanged starting material and from further eluates with chloroform there are obtained successively crystalline substance having M.P. 273–276° C. (39 mg.), M.P. 278–283° C. (425 mg.) and M.P. 274–278° C. (71 mg.). Said crystalline substance, in the amount of 39 mg. gives 17,17a-diol compound (3,3-ethylenedioxy-11β,16β,17β- or -11β,17β,17aβ-trihydroxy-D-homo-5-androsten-18-oic acid (11-18)-lactone: XII' or XIII') as narrow needles melting at 282–285° C. by recrystallization from methylene dichloride-acetone mixture, which exhibits characteristic absorption bands in infra-red region:

$\nu_{max.}^{CHCl_3}$ 3560, 3420, 1731 cm.$^{-1}$

The substances from the latter two eluates give 16,17-diol compound (3,3-ethylenedioxy-11β, 16α, 17α-trihydroxy-D-homo-5-androsten-18-oic acid (11-18)-lactone: XII) as narrow needles melting at 280–282.5° C. by recrystallization from methylene dichloride-methanol mixture or acetone. *Analysis.*—Calcd. for $C_{22}H_{30}O_6$ (390.46): C, 67.67; H, 7.74. Found: C, 67.14; H, 7.72. $[\alpha]_D^{29}$ −16.3±4° (CHCl₃).

$\lambda_{max.}^{EtOH}$ 206 mμ (ε 2,600). $\nu_{max.}^{CHCl_3}$ 3,600, 1766 cm.$^{-1}$

*Example 13*

To a solution of 100 mg. of 3,3-ethylenedioxy-11β,16α,17α-trihydroxy-D-homo-5-androsten-18-oic acid (11-18)-lactone in 10 ml. of dioxane is added a mixture of 300 mg. of periodic acid dihydrate, 6 ml. of water and 0.21 g. of pyridine after substitution of internal air with nitrogen and the mixture is kept at room temperature for 3 hours with occasional shaking in darkness. Then the mixture is concentrated to about half its volume at a low temperature under reduced pressure and extracted with methylene dichloride. After being washed with 2 N-phosphoric acid, water, 1 N-sodium bicarbonate solution and again with water, the extract is dried over anhydrous sodium sulfate and evaporated to dryness. The residue (103 mg.) is recrystallized from a mixture of methylene dichloride and ether to give 57.9 mg. of 3,3-ethylenedioxy - 11β - hydroxy-16,17-dioxo-16,17-seco-D-homo-5-androsten-18-oic acid (11-18)-lactone (XIV) as thin plates, M.P. 183–190° C. Pure substance: M.P. 194–199° C. (plates). *Analysis.*—Calcd. for $C_{22}H_{28}O_6$ (388.44): C, 68.02; H, 7.27. Found: C, 67.19; H, 7.23. $[\alpha]_D^{27}$ −14.5±2° (CHCl₃).

$\lambda_{max.}^{EtOH}$ 206 mμ (ε 2,900). $\nu_{max.}^{CHCl_3}$ 2720, 1767, 1728 cm.$^{-1}$

*Example 14*

To a solution of 677 mg. of 3,3ethylenedioxy-11β,16α,17α-trihydroxy-D-homo-5-androsten-18-oic acid (11-18)-lactone (XII) obtained according to Example 12 in 68 ml. of tetrahydrofuran wherein internal air is replaced with nitrogen is added a mixture of 2.03 g. of periodic acid dihydrate, 1.43 ml. of pyridine and 17 ml. of water wherein internal air is also replaced with nitrogen, and the mixture is kept at room temperature for 17 hours in darkness. After concentrating the mixture to about half its volume at a low temperature under reduced pressure, the concentrate is treated in the same manner as described in Example 13, whereby 620 mg. of crystalline residue is obtained. This is dissolved in 50 ml. of xylene and to this solution is added a mixture of 0.70 ml. of triethylamine, 0.432 ml. of acetic acid and 5 ml. of xylene. The resulting mixture is sealed in a tube under 0.01 mm. Hg pressure and then heated in an oil bath at 139±4° C. for 3 hours. After 2 days, content of the tube is diluted with 30 ml. of chloroform and then with a large volume of ice-water. The mixture is extracted with chloroform. The combined extract, after being washed successively with 4 N-phosphoric acid, water, sodium bicarbonate solution and then water under ice-cooling, is dried over anhydrous sodium sulfate and evaporated under reduced pressure. Crystalline residue (566 mg.) gives 348 mg. of crystalline substance of M.P. 254–261° C. by recrystallization from methylene dichloride-methanol mixture. Further recrystallization gives 250.4 mg. of 3,3-ethylenedioxy-11β - hydroxy - 17 - formyl-5,16-androstadien-18-oic acid (11-18)-lactone (XVI) as narrow plates melting at 266–271° C. $[\alpha]_D^{28}$ +22.5±3° (CHCl₃).

$\nu_{max.}^{CHCl_3}$ 2740, 1768, 1678, 1604 cm.$^{-1}$

Further 7.5 mg. of crystals is obtained from the mother liquor by chromatography on silica gel.

*Example 15*

3,3-ethylenedioxy-11β-hydroxy-17-formyl-5,16 - androstadien-18-oic acid (11-18)-lactone (XVI) (361 mg.) is hydrogenated over 210 mg. of 10% palladium-carbon in a solvent mixture of 50 ml. of dioxane and 50 ml. of 99% ethanol, the hydrogen-absorption being concluded within 40 minutes. The reaction mixture is filtered to remove the catalyst and evaporated under reduced pressure to give 370 mg. of crude product. Recrystallization from acetone-ether mixture gives pure 3,3-ethylenedioxy-11β-hydroxy-17β-formyl-5-androsten-18-oic acid (11-18)-lactone (XVII) as long plates melting at 204–209° C.

$\nu_{max.}^{CHCl_3}$ 2738, 1717, 1762 cm.$^{-1}$

*Example 16*

A mixture of 370 mg. of crude 3,3-ethylenedioxy-11β-hydroxy-17β-formyl-5-androsten-18-oic acid (11-18)-lactone (XVII), 10 ml. of acetic acid and 10 ml. of water is heated for 15 minutes on a steam bath, concentrated under reduced pressure, and then extracted with methylene dichloride. After being washed with 1 N-sodium bicarbonate solution and then water under ice-cooling, the resulting extract is dried over anhydrous sodium sulfate and evaporated under reduced pressure, whereby 296.5 mg. of crystalline residue is obtained. This gives 184.5 mg. of the corresponding free ketonic compound (3-oxo-17-formyl-11β-hydroxy-4-androsten-18-oic acid (11-18)-lactone (XVIII)) as prisms melting at 230–236° C. by recrystallization with methylene dichloride-acetone mixture.

$\nu_{max.}^{CHCl_3}$ 2732, 1763, 1713, 1661, 1614 cm.$^{-1}$

*Example 17*

To a solution of 188.6 mg. of 3-oxo-17-formyl-11β-hydroxy-4-androsten-18-oic (11-18)-lactone (XVIII) in 20 ml. of acetic acid is added another solution of 171 mg. of sodium bichromate dihydrate in 2 ml. of water and the mixture is kept at room temperature for 4 hours. The mixture is diluted with ice-water and then extracted with chloroform-methanol (4:1) mixture. After being washed with water, saturated sodium bicarbonate solution and then water under ice-cooling, the combined extract is dried over anhydrous sodium sulfate and distilled under reduced pressure to remove the solvent, whereby 92.7 mg.

of neutral substance is obtained. To the sodium bicarbonate washing solution is added 2 N-sulfuric acid under ice-cooling to make acidic and then extracted with chloroform-methanol (5:1) mixture. The extract, after being washed twice with water, is dried over anhydrous sodium sulfate and then evaporated under reduced pressure, whereby 84.0 mg. of acidic substance is obtained. This gives 72.7 mg. of 3-oxo-11β-hydroxy-17-carboxy-4-androsten-18-oic acid (11-18)-lactone (XIX) as fine crystals of M.P. 310–320° C. by recrystallization with methylene dichloride-methanol (9:1) mixture and acetone.

$\nu_{max.}^{Nujol}$ 3178, 1773, 1739, 1636, 1614 cm.$^{-1}$

The former neutral substance (92.7 mg.) gives the same product (XIX) of M.P. 310–320° C. (36.5 mg.) by repetition of the same oxidative reaction.

*Example 18*

To a solution of 8.1 mg. of 3-oxo-11β-hydroxy-17-carboxy-4-androsten-18-oic acid (11-18)-lactone (XIX) in chloroform-methanol (9:1) mixture is added another solution of diazomethane in ether, thereafter the mixture is kept for 20 minutes and then evaporated to dryness at a low temperature under reduced pressure. The residue gives 2.9 mg. of the methyl ester (3-oxo-11β-hydroxy-17-methoxy-carbonyl-4-androsten-18-oic acid (11-18)-lactone) as flat columns of M.P. 224–230° C. by recrystallization with acetone-ether mixture.

$\nu_{max.}^{CHCl_3}$ 1768, 1731, 1665, 1619 cm.$^{-1}$

This is identical with the authentic sample in comparison of M.P. and other characteristics.

*Example 19*

A mixture of 95.5 mg. of 3-oxo-11β-hydroxy-17-carboxy-4-androsten-18-oic acid (11-18)-lactone (XIX) and equivalent quantity of N/2-sodium hydroxide solution (F=1.013, 0.547 ml.) is lyophilized and then dried at 100–110° C. for 8 hours under reduced pressure (high vacuum). Powder of sodium salt thereby obtained is suspended in a mixture of 3 ml. of anhydrous benzene and one drop of anhydrous pyridine and then 0.50 ml. of newly distilled oxalyl chloride is added under ice-cooling. Reaction proceeds under ice-cooling with bubbling, which ceases within about 7 minutes. After 4 minutes, the reaction mixture is filtered with dry glass-filter and the solid material is washed twice with 1 ml. of anhydrous benzene. The filtrate and washing are combined and evaporated to dryness under reduced pressure at room temperature, and then the resulting residue is treated twice by the process comprising dissolving in 1 ml. of anhydrous benzene and evaporating to dryness. To an ice-cooled solution of thus obtained crystalline residue in 10 ml. of anhydrous benzene at −15° C. is added another ether solution of diazomethane (prepared by absorption of free diazomethane gas generated from 2 g. of nitrosomethylurea into 4 ml. of ether and then drying with metallic sodium) portionwise. The reaction mixture is kept for 1.5 hours at −15° C. and for 1.5 hours at 0° C. and then evaporated to dryness under reduced pressure at room temperature. The crystalline residue (101.0 mg.) gives 59.4 mg. of 21-diazo-3,20-dioxo-11β-hydroxy-4-pregnen-18-oic acid (11-18)-lactone (XX) as sandy crystals melting at 194–196° C. (decomp.) by recrystallization with acetone-ether mixture.

$\nu_{max.}^{CHCl_3}$ 2180, 1764, 1661, 1632 cm.$^{-1}$

*Example 20*

To 5 ml. of boiling acetic acid is added portionwise 63.7 mg. of 21-diazo-3,20-dioxo-11β-hydroxy-4-pregnen-18-oic acid (11-18)-lactone (XX), the reaction proceeding with liberation of gas. After the reaction is completed, the mixture is boiled 3 minutes and evaporated to dryness under reduced pressure. Thereby obtained residue (62.5 mg.) is dissolved in methylene dichloride, washed with 0.1 N-sodium bicarbonate solution and water, dried over anhydrous sodium sulfate and then evaporated to dryness under reduced pressure. The residue thereby obtained (60.2 mg.) is chromatographed on 4 g. of silica gel (5%-water content). The eluates with benzene-ethyl acetate (2:1) mixture gives 4.0 mg. of narrow long plates of M.P. 203–205° C. (crystallized in hot), 8.2 mg. of columns or long columns of M.P. 193–195°/203–204° C. (crystallized in cold) and columns of M.P. 190–192.5° C. (rather impure), Total: 20.8 mg. These three crystalline substances are proved identical with known 21-acetoxy-11β-hydroxy-3,20-dioxo-4-pregnen-18-oic acid (11-18)-lactone (XXI) by comparison of $[\alpha]_D$, infra-red spectrum measurement and mixed melting point determination. $[\alpha]_D^{28}$ +121.3±3° (CHCl$_3$).

$\nu_{max.}^{CHCl_3}$ 1769, 1744, 1724, 1683, 1618 cm.$^{-1}$

Of the compounds hereinbefore specifically set forth, the compounds having a ketalized oxo group at 3-position can be deketalized in a conventional manner, e.g., treatment with acetic acid, to give the corresponding free oxo compounds.

This application is a continuation-in-part of copending application Serial No. 127,097, filed July 27, 1961.

What is claimed is:

1. 17a-aza-D-homo-4-androstene-3,11,17-trione.
2. 3,3 - (lower)alkylenedioxy - 17a - aza - D - homo-5-androstene-11,17-dione.
3. A member selected from the group consisting of 3,11-dioxo-13,17-seco-4,12-androstadien-17-oic acid and lower alkyl ester thereof.
4. A member selected from the group consisting of 3,3-(lower)alkylenedioxy - 11 - oxo - 13,17 - seco - 5,12 - androstadien-17-oic acid and lower alkyl ester thereof.
5. 17 - hydroxy - 18 - nor - D - homo - 4,12,17 - androstatriene-3,11-dione.
6. 3,3 - (lower)alkylenedioxy - 17 - hydroxy - 18 - nor-D-homo 5,12,17-androstatriene-11-one.
7. 17α - hydroxy - 18 - nor - D - homo - 4,12 - androstadiene-3,11-dione.
8. 3,3 - (lower)alkylenedioxy - 17α - hydroxy - 18-nor-D-homo-5,12-androstadiene-11-one.
9. 17α - hydroxy - 3,11 - dioxo - D - homo - 4 - androstene-18-nitrile.
10. 3,3 - (lower)alkylenedioxy - 17α - hydroxy - 11-oxo-D-homo-5-androstene-18-nitrile.
11. 11β,17α - dihydroxy - 3 - oxo - D - homo - 4 - androsten-18-imidic acid (11-18)-lactone.
12. 3,3 - (lower)alkylenedioxy - 11β,17α - dihydroxy-D-homo-5-androsten-18-imidic acid (11-18)-lactone.
13. A compound of formula:

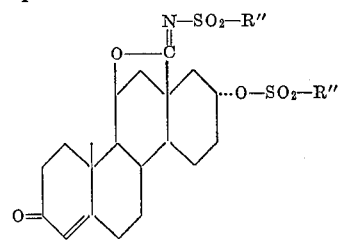

wherein R″ is a member selected from the group consisting of lower alkyl, phenyl and lower alkylphenyl.

14. A compound of formula:

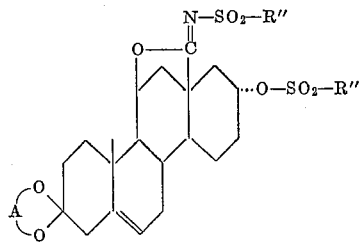

wherein R″ is a member selected from the group consisting of lower alkyl, phenyl, and lower alkylphenyl, and A is a lower alkylene.

15. 11β - hydroxy - 3 - oxo - D - homo - 4,16 - androstadien-18-oic acid (11-18)-lactone.

16. 3,3 - (lower)alkylenedioxy - 11β - hydroxy - D-homo-5,16-androstadien-18-oic acid (11-18)-lactone.

17. 11β,16,17 - trihydroxy - 3 - oxo - D - homo - 4 - androsten-18-oic acid (11-18)-lactone.

18. 3,3 - (lower)alkylenedioxy - 11β,16,17 - trihydroxy-D-homo-5-androsten-18-oic acid (11-18)-lactone.

19. 11β - hydroxy - 3,16,17 - trioxo - 16,17 - seco - D-homo-4-androsten-18-oic acid (11-18)-lactone.

20. 3,3 - (lower)alkylenedioxy - 11β - hydroxy - 16,17-dioxo - 16,17 - seco - D - homo - 5 - androsten - 18 - oic acid (11-18)-lactone.

21. 11β - hydroxy - 3 - oxo - 17 - formyl - 4,16 - androstadien-18-oic acid (11-18)-lactone.

22. 3,3 - (lower)alkylenedioxy - 11β - hydroxy - 17-formyl-5,16-androstadien-18-oic acid (11-18)-lactone.

23. 3,3 - (lower)alkylenedioxy - 11β - hydroxy - 17β-formyl-5-androsten-18-oic acid (11-18)-lactone.

24. 3 - oxo - 17β - formyl - 11β - hydroxy - 4 - androsten-18-oic acid (11-18)-lactone.

25. 3,20 - dioxo - 11β - hydroxy - 21 - diazo - 4 - pregnen - 18 - oic acid (11-18)-lactone.

No references cited.